United States Patent [19]

Iwamoto et al.

[11] 4,418,537

[45] Dec. 6, 1983

[54] SUPERCHARGER FOR AN INTERNAL COMBUSTION ENGINE

[75] Inventors: Kenzi Iwamoto, Nishio; Makoto Kuroyanagi, Hekinan, both of Japan

[73] Assignee: Nippon Soken, Inc., Nishio, Japan

[21] Appl. No.: 329,134

[22] Filed: Dec. 9, 1981

[30] Foreign Application Priority Data

Dec. 24, 1980 [JP] Japan ............................ 55-181887

[51] Int. Cl.³ .......................................... F02B 37/00
[52] U.S. Cl. ...................................... 60/611; 415/131
[58] Field of Search .................... 60/600, 601, 611; 417/407; 415/131, 132, 151, 157

[56] References Cited

U.S. PATENT DOCUMENTS 3,150,650  9/1964  Dreesen et al. ................ 60/611 X

FOREIGN PATENT DOCUMENTS 2855666  7/1980  Fed. Rep. of Germany ...... 417/407
54-20214  2/1979  Japan ................................ 415/131
54-42529  4/1979  Japan ................................ 60/611

Primary Examiner—William R. Cline
Attorney, Agent, or Firm—Cushman, Darby & Cushman

[57] ABSTRACT

A supercharger apparatus for an internal combustion engine. A compressor impeller is arranged in a compressor housing so that a clearance is formed therebetween. The housing is slidably connected to a housing for supporting a shaft on which the compressor impeller is connected, so that the compressor housing is moved between a first position where the clearance is minimum and a second position where the clearance is maximum. A fluid chamber is provided for receiving a fluid flow to generate pressure for moving the compressor housing between the first position and the second position in accordance with the operating condition of the engine to vary the clearance.

7 Claims, 3 Drawing Figures

SUPERCHARGER FOR AN INTERNAL COMBUSTION ENGINE

FIELD OF THE INVENTION

The present invention relates to an improvement in a supercharger for an internal combustion engine.

BACKGROUND OF THE INVENTION

In an internal combustion engine provided with a supercharger of an exhaust turbo type which has been recently developed, a turbine impeller receives the flow of exhaust gas, causing a compressor impeller to be rotated by the energy of the exhaust gas, so that an intake air is, under a supercharged condition, introduced into the engine. Thus, an increased amount of air is introduced into the engine when a throttle valve is fully opened. Thus, a necessary increase in the output power of the engine is attained during a full load of the engine.

In the conventional turbo system, the supercharging is always effected irrespective of a degree of throttle opening. However, the supercharging is not necessary during a partial load condition of the engine, since the throttle valve is, at this condition, moved from the fully opened condition in order to decrease the amount of intake air. Thus, the prior art suffers from a drawback in that energy is wasted in the compressor when the engine is operating under a partial load condition.

Supercharging during a partial or low load also causes a drawback in that drivability becomes worse during rapid acceleration or warming up because of the following reason. When an acceleration is effected by a rapid opening of the throttle valve, the rotational speed of the engine becomes high at the instant of the acceleration due to a pressure increase generated between the compressor and the throttle valve. However, an increase in the rotational speed of the impeller is slowed down due to the inertia of the impeller. Thus, a slow down of the increase of the rotational speed of the engine temporarily takes place, causing the drivability to deteriorate. When the engine is decelerated from an acceleration or high speed running, a decrease in the intake vacuum is delayed due to the inertia of the impeller, which adversely affects engine braking.

When a cold engine is started, an increase in torque necessary for operating the impeller takes place due to the viscosity of lubricant, so that the impeller is substantially not rotated. Thus, an intake resistance takes place to decrease the speed of increase in the rotational speed of the engine, causing engine to stall.

In order to overcome the above disadvantages a system has been heretofore presented for cancelling the operation of the supercharger when the engine is under a partial load. In such system, there is provided a by-pass passageway for introducing intake air into the engine without passing the compressor, or a by-pass passageway for preventing the exhaust gas from being introduced into the turbine to decrease turbine work. A combination of such by-pass passageways is also presented. These prior arts have as their object to decrease the back pressure and the temperature of the intake air, to improve the engine performance. The provision of the by-pass passageway, in the intake system requires extra parts, such as by-pass pipes and a valve, which additions are disadvantageous from the point of view of space and cost. The provision of the by-pass passageway in the exhaust system or combined by-pass passageways is disadvantageous in that the rotational speed of impeller becomes low so that the delay in the response of the supercharger is lengthened during transient conditions of the engine, such as acceleration or deceleration, cause the drivability to become worse.

SUMMARY OF THE INVENTION

An object of the present invention is to provide a supercharger for an internal combustion engine, capable of obtaining an increased drivability during the acceleration or warming-up condition irrespective of the simple structure of the supercharger.

According to the present invention a supercharger apparatus for an internal combustion engine is provided, comprising:
  means for receiving the energy of the exhaust gas in an exhaust system of the engine;
  a shaft connected to said means
  an impeller connected to an end of the shaft, said impeller is adapted for compressing a fluid passing through the apparatus;
  a first housing in which said impeller is arranged, said housing forming a part of an intake system of the engine,
  a second housing for supporting the shaft;
  journal means for rotatably supporting the shaft on the second housing; and,
  means for controlling a clearance formed between the housing and the impeller so that it is changed from a minimum value substantially equal to zero for effecting a compression of intake air to a maximum value for providing a by-pass passageway for the free passage of intake air therethrough.

BRIEF DESCRIPTION OF THE ATTACHED DRAWINGS

DETAILED DESCRIPTION OF A PREFERRED EMBODIMENT

Figure 1:
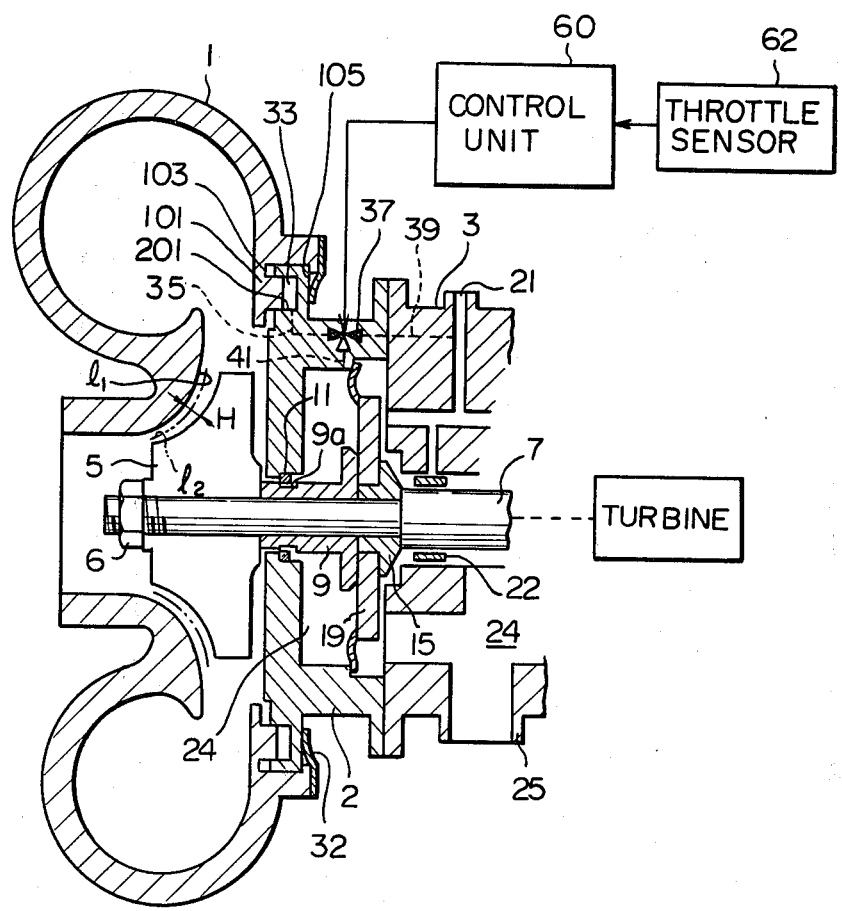
FIG. 1 is cross-sectional view of a turbo charger according to the present invention.

Now the present invention will be described with reference to the attached drawings. In FIG. 1 a turbo charger is provided with a compressor housing 1, a thrust housing 2 and a bearing housing 3. In the compressor housing 1, a compressor impeller 5 is arranged, which is connected to the end of a shaft 7 by means of a nut 6. On the other end of the shaft 7 a turbine impeller (not shown) is connected so that it can receive the flow of an exhaust gas from the engine in order to rotate the shaft 7. Due to the rotation of the shaft 7 the intake air passing through the compressor housing 1 is supplied to the engine under a supercharged condition.

A seal ring bushing 9 is inserted onto the shaft 7. The bushing 9 is provided with a annular groove 9a in which a seal ring 11 is located. Adjacent to the seal ring bushing 9, a thrust bushing 15 is inserted to the shaft 7, on which thrust bushing 15 a thrust bearing 19 is inserted. The bearing housing 3 is provided with an oil port 21 adapted for receiving lubrication oil directed to the thrust bearing 19 and a bearing member 22 of the shaft 7. The oil port 21 connected to a fuel supply (not shown) which is also connected to the engine lubrication system. The fuel source may produce an oil pressure of 1~5 kg/cm. The housing 3 defines therein a reservoir space 24 for receiving the oil after lubrication of the parts. The housing 3 is provided with a drain hole 25 for removing the oil from the reservoir 24.

Figure 2:
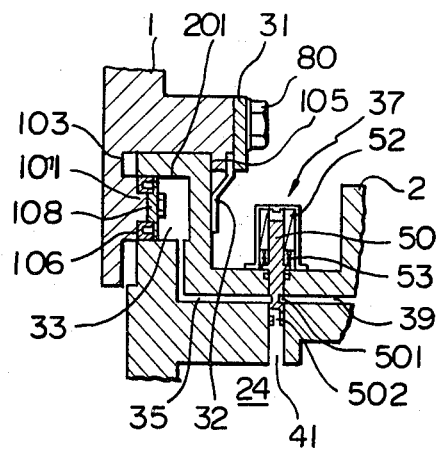
FIG. 2 is an enlarged partial cross-sectional view of FIG. 1, showing the extended position of the housing.
Figure 3:
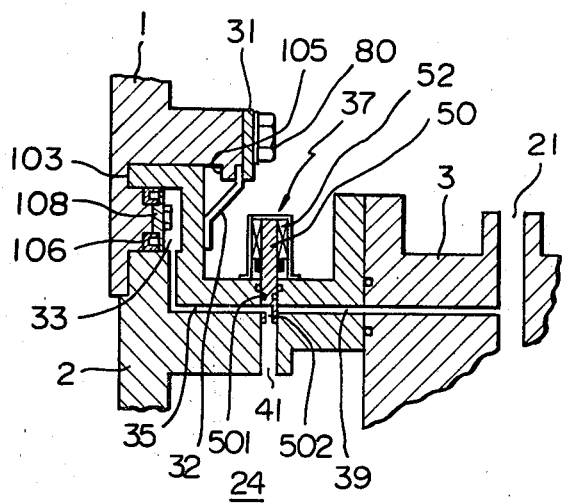
FIG. 3 is the same as FIG. 2, except that the housing is contracted.

According to the present invention, means are provided for varying a clearance H formed between the impeller 5 and the compressor housing. The thrust housing 2 has, at its outer periphery adjacent to the compressor housing, an annular groove 201 opened axially outwardly. The compressor housing 1 is provided with an annular projection 101 which is axially slidably inserted to the annular slide groove 201. Thus, a relative slide movement is allowed between the compressor housing 1 and the thrust housing 2. The compressor housing 1 is provided with a pair of axially spaced apart stopper surfaces 103 and 105. Thus the compressor housing 1 is moved between a first position where the surface 105 abuts the thrust housing 2 as shown in FIG. 2 and a second position where the surface 103 abuts the thrust housing 2 as shown in FIG. 3. As shown in FIGS. 2 or 3 leaf springs 32 are connected to the compressor housing 1 by means of a plate 31 and bolts 80. Inner free edges of the spring 32 contact the thrust housing 2 to generate a resilient force causing the compressor housing 1 to be moved to the position of FIG. 3 where the compressor housing 1 contacts at its stopper surface 103 with the thrust housing. Seal rings 106 are connected to the annular slide projection 101 by means of a seal ring retainer 108, so that a fluid tight annular pressure chamber 33 is formed between the annular groove 201 and the annular projection 101. The pressure chamber 33 is selectively connected to the fluid pressure source or the reservoir 24 by means of a fluid pressure introduction system. The system is comprised of a oil pressure conduit 35 opened to the pressure chamber 33, a conduit 39 connected to the oil supply port 21 as shown in FIG. 3 and a conduit 41 opened to the oil reservoir space 24, and a change over valve 37. The change over valve 37 is adapted for selectively connecting the conduit 35 to the oil supply conduit 39 or the oil return conduit 41. The change over valve 37 is of an electromagnetic type having a rod shaped valve member 50 slidably inserted into a bore in the housing 2, a solenoid 52 for effecting a movement of the rod 50 and a spring 53 for urging the rod so that the rod 50 is downwardly moved. The valve rod 50 has two valve passageways 501 and 502. The valve rod 50 is moved between a position illustrated in FIG. 2 where the conduit 35 is connected to the conduit 39 via the valve passageway 501 and is disconnected from the conduit 41, and a position of FIG. 3 where the conduit 35 is connected to the conduit 41 via the valve passageway 502 and is disconnected from the conduit 39.

The change over valve 37 is operated by a control unit 60 as illustrated in FIG. 1, which unit is adapted for receiving signals from various sensors, for example a throttle sensor 62, for detecting the operational condition of the engine.

Now the operation of the above mentioned construction will be described.

When the engine is operated, the pressure of the lubricant oil directed to the oil supply port 21 in the housing 3, from the not shown oil source, instantly reaches a predetermined level in the range from 1 to 5 Kg/cm². The supplied lubricant oil is directed to the thrust journal 19 and the journal portion 22 of the shaft for effecting the lubrication of the parts. The supplied oil is also directed to the oil pressure conduit 39. The throttle opening sensor 62 provides a signal indicating the position of the throttle valve of the engine, i.e., the load of the engine, which signal is introduced into the control unit 60 for providing a signal introduced into the solenoid of the change over valve 37.

When the engine is operating under any partial load condition other then full load condition, the solenoid 52 of the change over valve 37 is not energized, so that the rod 50 is by the force of the spring 53 moved downwardly to the position shown in FIG. 2. Thus, the oil conduit 35 is connected with the oil pressure supply conduit 39 and is disconnected from the return conduit 41. Thus, the oil is introduced into the oil pressure chamber 33, so that the oil pressure in the chamber 33 causes the compressor housing 1 to be moved against the force of the spring 32 until the stopper portion 105 contacts the surface of the housing 2. Thus, the inner surface of the compressor housing is spaced from the compressor impeller 5 as shown by the solid line $l_1$ in FIG. 1. Thus a clearance H between the inner surface and the impeller becomes larger. Therefore, a by-pass passageway is formed between the housing 1 and the impeller 5.

When the engine of very low temperature is started, due to the high viscosity of the lubricant oil for the engine, the torque for operating the impeller becomes high. Thus, an increase in the rotational speed of the compressor becomes difficult, causing the impeller to provide a large flow resistance when the intake air is passed through the impeller 5, so that the operation of a cold engine which has just been started is apt to be unstable. According to the present invention, however, a by-pass passageway is formed between the housing 1 and the impeller 5 when the cold engine is started, so that the impeller does not provide any flow resistance when the intake air passes. Thus a stable operation of the cold engine can be obtained.

When the engine is operating under a partial load, the clearance H is also large even if the engine is fully warmed-up. A substantially constant energy of the exhaust gas is received by the not shown turbine impeller for rotating the shaft 7 irrespective of dimension of the clearance. However, a large clearance H causes the load necessary to rotate the compressor 5 to decrease. This decrease in the load of compressor corresponds to the increase in the rotational speed of the impeller 5. The formation of the by-pass passageway decreases the pressure difference between the input and output of the compressor 5, preventing the temperature of the engine from being increased.

When the engine is operating under a full load, the throttle sensor 62 provides a signal which is received by the control unit 60 so that the control unit 60 issues a second signal introduced into the solenoid 52 of the valve 37. Thus, the solenoid 52 is energized, so that the rod 50 is upwardly moved against the force of the spring 53. Thus, the rod is located on a position as illustrated in FIG. 3 where the oil conduit 35 is connected to the return conduit 41 and is disconnected from the supply conduit 39. Thus, the oil in the chamber 33 is exhausted to the reservoir 24, so that the compressor housing 1 is moved to the right in the drawing by the force of the spring 32, until the stopper 103 is contacted with the end surface of the housing 2. In this case the inner surface of the compressor housing 1 is moved to a position indicated by the phantom line $l_2$, so that the clearance H becomes small enough to eliminate a by-pass passageway therebetween. Thus, the impeller 5 can attain a high compression efficiency to effect supercharging. Since the rotational speed of the impeller during a partial load of the engine is high as already described, thus a high supercharging effect is quickly obtained at the instant, so that a smooth acceleration of the engine is attained.

When the throttle valve is closed from the acceleration or high speed operating condition, the throttle sensor 62 provides a signal to cause the operating unit 60 to de-energize the solenoid 62. Thus, the valve rod 50 is moved to the position of FIG. 2 where the oil pressure passageway 35 is connected to the oil supply passageway 39 as illustrated in FIG. 2. Thus, the pressure in the chamber 33 becomes high enough to cause the compressor housing 1 to be moved against the force of the spring 32, so that the clearance H increases. Thus, a by-pass passageway is formed to decrease the supercharging effect. Thus, the pressure in the intake line of the engine is quickly decreased from the start of deceleration, to obtain a high engine braking efficiency.

While the present invention is described with reference to the attached drawings, many modification and changes may be made by those skilled in this art.

We claim:

1. A supercharger apparatus for an internal combustion engine, comprising:
   means for receiving the energy of the exhaust gas in an exhaust system of the engine;
   a shaft connected to said means;
   an impeller connected to an end of the shaft, said impeller is adapted for compressing a fluid passing through the apparatus;
   a first housing in which said impeller is arranged, said housing forming a part of an intake system of the engine,
   a second housing for supporting the shaft;
   journal means for rotatably supporting the shaft on the second housing; and,
   means for controlling a clearance formed between the first housing and the impeller so that it is changed from a minimum valve substantially equal to zero for effecting a compression of intake air to a maximum value for providing a by-pass passageway for the free passage of intake air therethrough, wherein said means for controlling the clearance comprises first means responsive to fluid pressure for effecting a limited relative axial movement between the first and the second housings, and second means for producing a fluid pressure directed to the first means,
   wherein one of said housings is provided with an axially outwardly opened annular groove, whereas the other one of said housings is provided with an annular projection which is axially slidably inserted into the annular groove, wherein said first means comprise stopping means for limiting the axial slide movement between a first position where the clearance attains the minimum value and a second position where the clearance attains the maximum value, and biasing means for generating a force to urge one of the housings toward one of the positions, and wherein said second means comprise a pressure chamber formed between the annular groove and the annular projection.

2. A supercharger apparatus for an internal combustion engine according to claim 1, wherein said biasing means comprise a leaf spring, one end of which is connected to one of the housings, and the other end of which engages the other housing so as to generate the biasing force.

3. A supercharger apparatus for an internal combustion engine according to claim 1, further comprising means for selectively introducing fluid pressure into the chamber.

4. A supercharger apparatus for an internal combustion engine according to claim 3, said means for selectively introducing fluid pressure comprising change over valve, a first passageway connecting the valve with the chamber, a second passageway connecting the valve with a reservoir, and a third passageway connecting the valve with a high pressure source, said valve being switched between a first condition where the second passageway is connected to the first passageway and a second condition where the first passageway is connected to the third passageway.

5. A supercharger apparatus for an internal combustion engine according to claim 4, further comprising means responsive to the operating condition of the engine to provide an electrical signal directed to the change over valve for switching the valve between the first condition and the second condition, thereby causing the clearance to be varied in accordance with the operating condition of the engine to obtain a desired supercharging effect.

6. A supercharger apparatus for an internal combustion engine according to claim 5, wherein, said change over valve is of an electro-magnetic type, and wherein said operating means comprise means for providing an electric signal indicating the operating condition of the engine and an operating unit responsive to the electric signal for providing an electric signal directed to the electro-magnetic valve.

7. A supercharger apparatus for an internal combustion engine, comprising:
   means for receiving the energy of the exhaust gas in an exhaust system of the engine;
   a shaft connected to said means;
   an impeller connected to an end of the shaft, said impeller being adapted for compressing a fluid passing through the apparatus;
   a first housing in which said impeller is arranged so that a clearance is formed therebetween, said housing forming a part of the intake system of the engine;
   a second housing for the shaft;
   journal means for rotatably supporting the shaft in the second housing,
   one of the housings being provided with an axially outwardly opened annular groove, whereas the other one of the housings is provided with an annular projection which is axially slidably inserted into the annular groove,
   stopping means for limiting the axial slide movement between a first position where the clearance is the minimum value and a second position where the clearance attains the maximum value,
   resilient biasing means for generating a resilient force for urging one of the housings toward one of the position,
   a pressure chamber formed by the annular groove and the annular projection, and;
   an electromagnetic change over valve;
   a first passageway connecting the valve with the chamber;

a second passageway connecting the valve with an oil reservoir;

a third passageway connecting the valve with a high pressure source, said valve being movable between a first condition where the second passageway is connected to the first passageway and a second condition where the first passageway is connected to the third passageway, and;

means responsive to the operating condition of the engine to provide an electrical signal introduced into the electro-magnetic valve for switching the valve between the first condition and the second condition.

* * * * *